United States Patent
Gudmundsson et al.

(10) Patent No.: US 7,356,421 B2
(45) Date of Patent: Apr. 8, 2008

(54) PRECISE LOCATION OF BURIED METALLIC PIPES AND CABLES IN THE PRESENCE OF SIGNAL DISTORTION

(75) Inventors: Thorkell Gudmundsson, San Jose, CA (US); Jim Waite, Los Gatos, CA (US); Johan Överby, Sunnyvale, CA (US); Stevan Polak, Aptos, CA (US); Niklas Lindstrom, Sunnyvale, CA (US)

(73) Assignee: Metrotech Corporation, Inc., Santa Clara, CA (US)

( * ) Notice: Subject to any disclaimer, the term of this patent is extended or adjusted under 35 U.S.C. 154(b) by 214 days.

(21) Appl. No.: 11/100,696

(22) Filed: Apr. 6, 2005

(65) Prior Publication Data
US 2006/0036376 A1   Feb. 16, 2006

(51) Int. Cl.
*G01V 3/15*   (2006.01)
(52) U.S. Cl. ............ 702/38; 324/67; 324/207.11; 324/207.17; 324/207.22; 324/207.26; 324/237; 324/243; 324/326; 324/327; 324/328; 324/329
(58) Field of Classification Search .......... 702/38; 324/326–329
See application file for complete search history.

(56) References Cited

U.S. PATENT DOCUMENTS 6,140,819 A * 10/2000 Peterman et al. ........... 324/326

FOREIGN PATENT DOCUMENTS

GB   2 220 071 A  * 12/1998

* cited by examiner

*Primary Examiner*—John Barlow
*Assistant Examiner*—Sujoy Kundu
(74) *Attorney, Agent, or Firm*—Finnegan, Henderson, Farabow, Garrett & Dunner, L.L.P.

(57) ABSTRACT

A new approach for locating an underground line described herein remains accurate in the face of bleedover by including both amplitude and phase from at least two magnetic field strength sensors in the measurement set. A numerical optimization step is introduced to deduce the positions and currents of each of several cables, of which one is the targeted cable and the others are termed bleedover cables. Furthermore, some embodiments of the method accounts for practical problems that exist in the field that relate to reliable estimation of cable positions, like the phase transfer function between transmitter and receiver, the estimation of confidence bounds for each estimate, and the rejection of false positive locates due to the presence of noise and interference.

44 Claims, 5 Drawing Sheets

PRECISE LOCATION OF BURIED METALLIC PIPES AND CABLES IN THE PRESENCE OF SIGNAL DISTORTION

BACKGROUND

1. Field of the Invention

The present invention relates to detection of electromagnetic signals from targeted hidden conductors and, in particular, to the precise location of such conductors in the presence of signal distortion.

2. Discussion of Related Art

Underground pipe and cable locators (sometimes termed line locators) have existed for many years and are well known. Line locator systems typically include a mobile receiver and a transmitter. The transmitter can be coupled to a target conductor, either by direct electrical connection or through induction, to provide a current signal on the target conductor. The receiver detects and processes signals resulting from the electromagnetic field generated at the target conductor as a result of the current signal. The signal detected at the line locator can be a continuous wave sinusoidal signal provided to the target conductor by the transmitter.

The transmitter is often physically separated from the receiver, with a typical separation distance of several meters or in some cases up to many kilometers. The transmitter couples the current signal, whose frequency can be user selected from a selectable set of frequencies, to the target conductor. The frequency of the current signal applied to the target conductor can be referred to as the active locate frequency. The target conductor generates an electromagnetic field at the active locate frequency in response to the current signal.

Different location methodologies and underground environments can call for different active frequencies. The typical range of active locate frequencies can be from several Hertz (for location of the target conductor over separation distances between the transmitter and receiver of many kilometers) to 100 kHz or more. Significant radio frequency interference on the electromagentic field detected by the receiver can be present in the environment over this range. Therefore, receivers of line location systems have often included highly tuned filters to preclude interference from outside sources from affecting the measurement of signals at the desired active locate frequency from the target conductor. These filters can be tuned to receive signals resulting from electromagnetic fields at each of the selectable active locate frequencies and reject signals resulting from electromagnetic fields at frequencies other than the active locate frequencies.

In line location systems, the signal strength parameter determined from detection of the electromagnetic field provides a basis for derived quantities of the current signal (i.e., the line current in the targeted conductor), position of the line locator receiver relative to the center of the conductor, depth of the conductor from the line locator receiver, and can also be used as the input to a peak or null indicator (depending on the orientation of the magnetic field to which the detector is sensitive). Line location systems measure signal strength at one or more active frequencies, also referred to as measurement channels.

For detection of cables or pipes laying in a continuous path (e.g., buried in a trench or occupying an underground conduit extending over some distance), an assumption is often made that the induced magnetic field is concentric around the cable and that signal strength is dependent only on the local ground conductivity, the depth and horizontal position of the target cable, and the magnitude of AC current flowing in the cable. When this is the case, the electromagnetic field at the detector of the line locator, on which the signal strength depends, is said to be free of distortion.

Nearly all locating systems present a "peak" indication that results from a horizontally-oriented coil, with axis orthogonal to the direction of the cable, that has a maximum deflection over the presumed centerline of the cable, assuming the ideal undistorted field. Some locating systems also present a "null" output from a vertically-oriented coil, which has a minimum at the same position, again making the same ideal assumption about the magnetic field.

Often in a crowded underground utility environment of metallic pipes and cables, coupling of signals at the active locating frequency from the target conductor to other adjacent underground conductors can occur. These conductors (lines) are not intended to be tracked by the line location system, but coupling of currents from the target conductor to those neighboring conductors through various means (resistive, inductive, or capacitive), termed "bleedover," can lead a line locator astray such that the operator of the line location system ceases tracking the targeted conductor (e.g., pipe or cable of interest) and instead begins following an adjacent line. In some cases, there may be bias in the targeted conductor's estimated centerline as a result of distortion due to bleedover.

In conventional receivers, it is very difficult to determine whether the receiver is tracking the targeted conductor or whether the receiver is erroneously tracking a neighboring conductor. Therefore, there is a need for refinement of walkover line location systems to allow precise location of an underground conductor in the presence of distortion due to significant bleedover to other conductors.

SUMMARY

In accordance with the present invention, a line locator system used in walkover locate mode is presented that can accurately present a precise centerline and depth of the targeted conductor even in the presence of high field distortion due to bleedover.

A method for precise location of underground cables and pipes according to some embodiments of the present invention includes measuring a set of complex electromagnetic field strengths at a plurality of positions along a path that crosses a target line; modeling an expected complex field strength at each of the plurality of positions with the target line and a hypothesized number of bleedover cables to form a set of hypothesized values corresponding to a set of individual models for the target line for each of the hypothesized number of bleedover cables; determining which of the set of individual models is a best model; and determining parameters related to the target line from the best model.

A line locator according to some embodiments of the present invention includes a plurality of coil detectors, each of the plurality of coil detectors oriented to measure a component of a magnetic field; circuitry coupled to receive signals from the plurality of coil detectors and provide quadrature signals indicating a complex magnetic field strength; a position locator for indicating a position of the line locator; a processor coupled to receive the complex magnetic field strength and the position and calculate values related to a target line; and a display coupled to the processor, the display indicating to a user the values related to the target line, wherein the processor includes software for performing the following: modeling an expected complex field strength corresponding to complex field strengths measured at the plurality of coil detectors at each of a plurality of positions determined by the position locator with the target line and a hypothesized number of bleedover cables to form a set of hypothesized values corresponding to a set of individual models for the target line for each of the hypothesized number of bleedover cables; and determining which of the set of individual models is a best model; and determining parameters related to the target line from the best model.

These and other embodiments are further discussed below with reference to the following figures.

In the figures, elements having the same designation have the same or similar functions. Elements in the figures are not drawn to scale.

DETAILED DESCRIPTION

Figure 1:
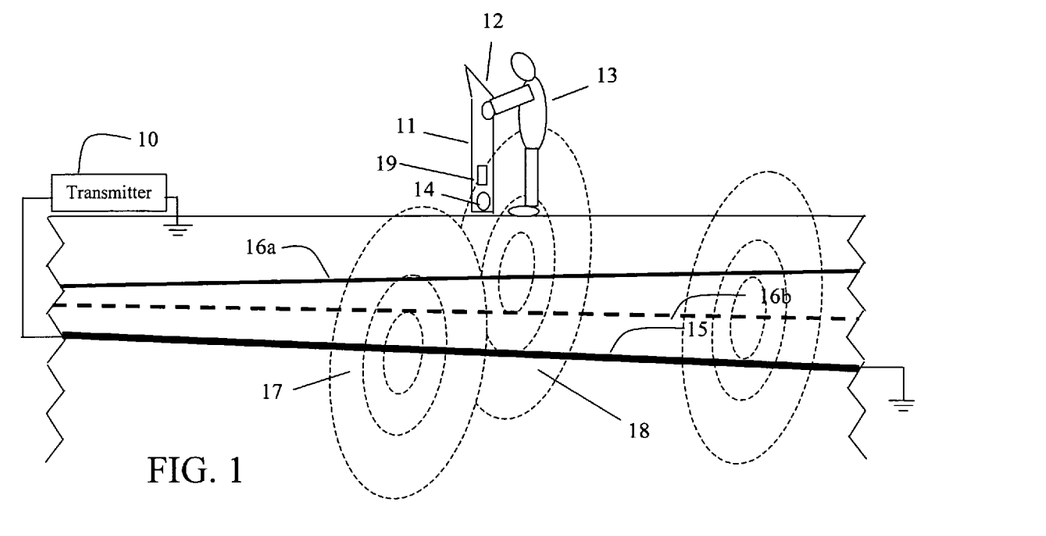
FIG. 1 illustrates the aboveground use of a locate receiver according to some embodiments of the present invention to locate the position of an underground targeted conductor in the presence of bleedover to an adjacent conductor.

FIG. 1 illustrates a line location environment with a line locator 11. A target cable 15 energized by an electric current from transmitter 10 emits an electromagnetic field 17. Electromagnetic field 17 induces a current in nearby bleedover conductors such as conductors 16A and 16B (collectively conductors 16) because of resistive, inductive, or capacitive bleedover. The bleedover current in conductors 16 emits an electromagnetic field 18. The sum of the two fields can be detected at the surface by electromagnetic detector coils such as electromagnetic detector coils 14 and 19 of line locator 11. If locator 11 includes both vertical coil 19 and horizontal coil 14, two orthogonal sets of measurements of the strength of the electromagnetic field as a function of position over the target line can be obtained. Orthogonal horizontal coil 24 measures the magnetic field that does not lie in the plane defined by vertical coil 19 and horizontal coil 14. In general, line locator 11 may include any number of detector coils. Using a walkover locate method, field measurements can be detected at multiple positions of line locator 11 as operator 13 walks transversely across target line 15. With the enhanced model-based method described below, the centerline, depth, and current in target conductor 15 can be computed and presented to operator 13 on display 12.

Although line locator 11 illustrated in FIG. 1 is a handheld locator, embodiments of a line locator according to the present invention can be mounted on vehicles or included in other devices that can be moved relative to target conductor 15. Line locator 11 is movable in order to sample the electromagnetic field generated by target conductor 15 and bleedover conductors 16 that significantly contribute to the electromagnetic field sampled by line locator 11.

It is often difficult to distinguish signals resulting from target conductor 15 and signals resulting from neighboring conductors 16a and 16b where bleedover has occurred, even if the receiver of line locator 11 provides an indication of the signal direction as well as signal strength. A system that provides an indication of the signal direction as well as signal strength is described in U.S. patent application Ser. No. 10/622,376, by James W. Waite and Johan D. Överby (the '376 application), which is assigned to Metrotech Corporation and herein incorporated by reference in its entirety.

U.S. patent application Ser. No. 10/842,239, by Hubert Schlapp and Johan D. Överby (the '239 application), which is assigned to Metrotech Corporation and herein incorporated by reference in its entirety, discloses a new signal processing structure called "bleedover decoupling" that allows a line locator system to distinguish between signals received from a targeted conductor 15 and signals received as a result of bleedover to neighboring conductors 16. The '239 application also describes an example of a "walkover" technique.

In the '239 application, a "walkover locate" algorithm is described in some embodiments of a system that utilizes a bleedover decoupling processing system to create more accurate estimates of centerline, depth, and current. The walkover locate process consists of a repeated quadrature measurement of the magnetic field as a function of a transect distance, i.e., as the receiver moves transversely above a target cable such as target cable 15. The data are fit to a model using a numerical optimization approach, and from the model the cable centerline, depth, and current estimates are obtained.

Systems disclosed in the '239 application represent an important advance in the detection and reporting of signal distortion due to bleedover. However, in the particular case of long haul cables resident in ducts with many other cables, the effect of the phase transfer function that occurs between the locating system transmitter 10 and locator 11, the estimation of confidence bounds for centerline and depth estimates, and the rejection of false positive locates due to the presence of noise and interference were not discussed. The disclosure in the '239 application focused on the demodulation method used to determine the phase of the bleedover signal, but did not address the case where the induced magnetic field has nulls where the measurable field disappears. At the null points, the digital phase locked loop described in the '376 application can fail to hold a lock to the transmitter signal and the measurement results can become imprecise for some distance segment around the location where there is a null in the electromagnetic field. Therefore, further corrections can be made to the bleedover calculation so that more accurate prediction of true centerline and depth of the conductor results.

The refinements of the models disclosed herein can account for the phase transfer function that occurs between the locating system transmitter 10 and receiver 11 along targeted conductor 15, can account for the present confidence bounds for both the centerline and depth estimates, and can reject false positive locates due to the presence of noise and interference in the environment. Furthermore, to account for the presence of an arbitrarily complex magnetic field (again, due to distortion), the refinements can ensure that the estimates of magnetic field strength are accurate over the entire walkover to avoid systematic errors in the field modeling and hence biases in the estimates of centerline and depth.

The phase of a tone (e.g., current signal of a determined frequency) placed on a cable 15 by transmitter 10 carries information that may be used by locator 11 to determine the degree of signal distortion, as well as the direction of the signal. Locator 11 measures the signal phase relative to a reference signal detectable at receiver 11. This reference signal may be transmitted to receiver 11 separately from a signal source (such as via an aboveground cable or wireless radio link between transmitter 10 and receiver 11), may be determined from an independent synchronized time source (such as a global positioning system (GPS)), or may be embedded in the signal measured from cable 15 itself. The latter approach requires no external equipment or wires to implement.

Any transmission medium can affect the phase of a tone traveling along it. This effect is a function of the electrical characteristics of the medium, the distance the signal travels, and the frequency of the tone. For long-haul fiber cables with metallic sheaths and a tone signal frequency above a few Hz, this distortion can become significant. Both measurement and transmission-line models indicate that the phase can easily change by about 1° to about 3° for each mile traveled and is dependent on local soil conditions, making the phase at a locate site somewhere on a 50 mile cable run difficult to determine. Soil dampness and the cable termination impedance can particularly affect phase distortion. In particular, non-uniform soil conditions, such as conductivity, lead to non-uniform phase distortion along a cable, and different termination impedances lead to further distortion near the termination.

Bleedover distortion at a locate site generally results from an interplay of several complex phenomena. An approach for separating this distortion from the main signal from target conductor 15 when the phases of the two differ by 90° is described in the '239 application. In some cases (as for long-haul fiber optic cables collocated in duct structures), the distortion is not necessarily orthogonal to the signal from target conductor 15, so the distortion cannot be fully removed without further correction. In particular, unless the bleedover signal is almost 90° out of phase with the signal from target conductor 15, a significant distortion component can be present in the inphase part of the measured field. This bleedover component may appear as a positive or negative current in the bleedover cable, depending on the exact phase offset of the bleedover signal. Thus, a measurement of the current due to bleedover by locate receiver 11 as described in the '239 application may appear similar to a measurement of resistively-coupled "return current" (i.e., current that results from a galvanic connection to the target cable, likely because of a common ground at a splice).

To accurately identify the depth and centerline of target cable 15, the presence of non-orthogonal bleedover can be incorporated into the optimization method disclosed in the '239 application. As disclosed herein, the model presented in the '239 application is extended using a generalized formulation that vectors an aggregate measurement of the magnetic field to one target cable 15 by decoupling the influence of additional bleedover cables (such as cables 16, for example) that are hypothesized to exist. This bleedover decoupling model can be solved via a non-linear numerical optimization method, such as the Levenberg-Marquardt algorithm and other model-based methods (R. Fletcher, "Practical Methods of Optimization", Wiley, 2003.).

The electromagnetic field measurements at line locator 11 are complex valued and represent the aggregate phase of the magnetic field measurement at the particular aboveground position of the measurement. To show this, the constituent parts of the electromagnetic field can be modeled as a sum of the constituent individual magnetic fields. The field generated by the primary cable (target conductor 15) is distorted by fields generated by nearby cables, such as cables 16, that carry bleedover current induced by target cable 15 and/or return current through a common ground connection. Therefore, the measured electromagnetic field at line locator 11 is a summation of three terms, $$h_{measured} = h_{primary} + h_{return} + h_{bleedover}, \qquad (1)$$

where $h_{primary}$ is the magnetic field generated by target cable 15, $h_{return}$ is the magnetic field generated by return current to transmitter 10, and $h_{bleedover}$ is the magnetic field generated by bleedover cables such as cables 16a and 16b shown in FIG. 1.

To correctly model EQN. 1, it is necessary to accurately estimate the phase of the electromagnetic field generated by each cable. This estimation can be done using the signal select modulation scheme (as described in U.S. Pat. No. 6,411,073, which is herein incorporated by reference in its entirety) and the bleedover decoupling signal processing scheme described in the '239 application. Using this approach, the phase of the electromagnetic field measured at line locator 11 can be determined, relative to a reference imparted at transmitter 10. A resistive model best describes the galvanic (direct) coupling related to the terms $h_{primary}$ and $h_{return}$. In this case the magnetic field can be added directly using only a sign change for whether the current in the cable is flowing in a forward or reverse direction (phase 0° or 180°).

Bleedover models for $h_{bleedover}$ vary depending on the coupling mechanism. Inductive or capacitive coupling (or a combination of both) can occur to other co-located cables as well. The phase of the signal from a cable carrying bleedover current is not as constrained as for resistive coupling. Furthermore, strong return currents can be the source of bleedover, resulting in an ambiguity in the sign of the bleedover phase. Therefore, for the purpose of this discussion, $h_{return}$ and $h_{bleedover}$ are treated as indistinguishable, since each can be composed of both inphase and quadrature components.

An unknown and not insignificant phase offset exists for long cables, for example, cables over several kilometers in length. This offset phase θ can be modeled by a uniform rotation of all the individual cable phases at the measurement location by the same amount. In a system identification framework, the offset phase θ can be viewed as the phase transfer function between transmitter 10 and line locator receiver 11, which can be separated by significant distances (tens of kilometers) in some cases.

Therefore, EQN. 1 can be rewritten as:

$$h_{measured} = e^{i\theta}(h_{primary} + h_{inphase} + h_{quadrature}) \qquad (2)$$

Generally $h_{primary}$ is real (with zero phase), as is $h_{inphase}$ by definition. An exception to this is when the conductivity of the ground in which the cables are buried is high. In that case, the magnetic field induced by the primary current may not be completely inphase and the bleedover field can be further distorted.

To estimate the location of target cable 15, several of the magnetic field measurements can be taken as locator 11 is traversed over a cross-section of target cable 15. These measurements, along with the horizontal coordinates at which they are taken, are then matched with a model of the magnetic field generated by the system of underground cables (target cable 15 and surrounding bleedover cables 16) as a function of position to estimate the depth of cable 15 and the horizontal centerline coordinate. In addition, an estimate of the current in cable 15 and the soil conductivity may be extracted from the results.

A computational model for the in-phase field as a function of location includes the use of several parameters, including:

| Depth of the primary cable | $z_0$ |
| Centerline of the primary cable | $x_0$ |
| Primary current (current in target cable) | $I_0$ |
| Number of bleedover cables | k |
| Depth of the $p^{th}$ bleedover cable | $z_p$ |
| Centerline of the $p^{th}$ bleedover cable | $x_p$ |
| Current in the $p^{th}$ secondary cable | $I_p^i + jI_p^q$ |
| A uniform soil conductivity parameter | $\sigma$ |

The model according to some embodiments of the present invention assumes that target cable 15 is locally long enough that the induced magnetic field is cylindrical. A further assumption is that target cable 15 and bleedover cables 16 are parallel. If this latter assumption is incorrect, the model may not accurately estimate the locations of bleedover cables 16. However, identifying the locations of bleedover cables 16 is not the goal. The accurate location of target cable 15 will still be obtained even if the location of the bleedover cables is inaccurate.

Each field source generates a radially decaying field according to the equation:

$$h(r) = \frac{I}{2\pi} \int_0^\infty \frac{2\xi e^{-r\sqrt{\xi^2+2j\delta^{-2}}}}{\xi + \sqrt{\xi^2 + 2j\delta^{-2}}} d\xi, \quad (3)$$

where r is the distance from the source, $j=\sqrt{-1}$, and $\delta$ is the skin depth of the ground at the signal frequency, $$\delta = \frac{1}{\sqrt{\pi\mu\sigma f}}, \quad (4)$$

with $\mu$=permeability of free space ($4\pi 10^{-7}$), $\sigma$=conductivity of the ground and f=signal frequency in Hz.

If the source of a magnetic field from a long conductor is at depth z and centerline x, and this field is measured by a horizontal coil 14 at x-coordinate $x_n$, the coil is oriented at an angle $\gamma$ with respect to the full field, where $$\cos\gamma_n = \frac{z}{r_n} \quad (5)$$
$$r_n^2 = (x_n - x)^2 + z^2.$$

So the measurement at the $n^{th}$ position is $$h_n = h(r_n)\frac{z}{r_n}. \quad (6)$$

In general, the measurement is a complex number, representing the non-zero phase of the signal.

In the limit when $\sigma$ goes to 0, EQN. 6 reduces to $$h_n = \frac{Iz}{2\pi r_n^2} \quad (7)$$

In this simple case, an optimization algorithm can be given the task of matching the measured data to the simple model $$h_n = \frac{I_0 z_0}{2\pi((x_n - x_0)^2 + z_0^2)} \quad (8)$$

for several measurements ($x_n$, $h_n$, where $h_n$ can be complex indicating a non-zero phase). In some embodiments of the model, the current value $I_0$ can include a phase to introduce a small imaginary component to $h_n$. For this simple case of a single conductor, emanating a concentric magnetic field in response to the applied transmitter signal, even the presence of significant measurement noise causes only small errors in the estimated parameters when several measurements are taken.

If a vertically oriented null coil is used to measure the field strength rather than the horizontal peak coil, the optimization takes a slightly different form:

$$h_v = \frac{I_0(x_n - x_0)}{2\pi((x_n - x_0)^2 + z_0^2)} \quad (9)$$

Likewise, expressions for the field strength can be derived if the sensing coils are mounted at other arbitrary geometric angles.

Figure 2:
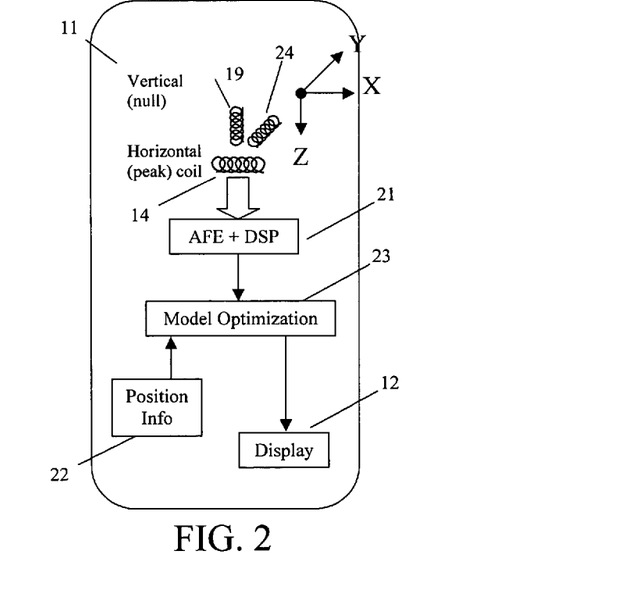
FIG. 2 illustrates a block diagram of a locator receiver according to some embodiments of the present invention.

FIG. 2 illustrates an embodiment of a locator receiver 100 according to some embodiments of the invention. The embodiment of locator II shown in FIG. 2 includes sensing coils 14, 19, and 24, although any number of sensing coils oriented in any orientations can be included. Sensing coils (or detectors) 14 and 19 are coupled to analog front-end (AFE) electronics 21. AFE electronics 21 provides signal conditioning, including amplification, alias protection, and interference filtering prior to analog-to-digital conversion. A digital signal processor implements the phase and field strength amplitude detection algorithm described in the '239 application. These results, as well as distance measurements from block 22, are provided to the optimization block 23. The output signal from AFE electronics 21 is input to model optimization 23. Further, information regarding the position of line locator 11 is measured in position info 22 and provided for model optimization 23. Model optimization 23 optimizes the model utilized to estimate unknown parameters and provides the estimated parameters to display 12 for presentation.

The optimization algorithm that includes the affect of one or more bleedover sources matches the measured horizontal coil data to the model $$h_n = \frac{I_0 z_0}{2\pi((x_n - x_0)^2 + z_0^2)} + \sum_{p=1}^{k} \frac{I_p^i z_p}{2\pi((x_n - x_p)^2 + z_p^2)} \quad (10)$$

representing the target cable and a number of secondary cables that contribute to the electromagnetic field through bleedover. In a similar way the vertical (null) field model describing the vertical coil measurements can be expanded to multiple cables.

Figure 3A:
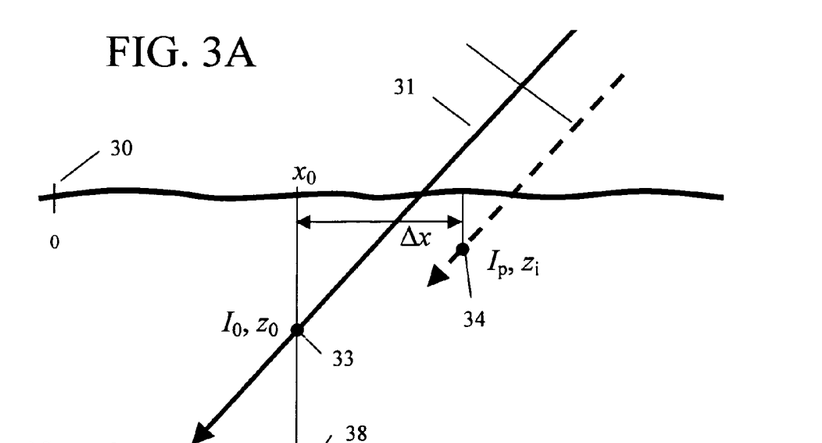
FIGS. 3A and 3B are diagrammatic representations of a walkover locate process where the induced magnetic field on a target conductor is distorted by a field on a bleedover conductor.
Figure 3B:
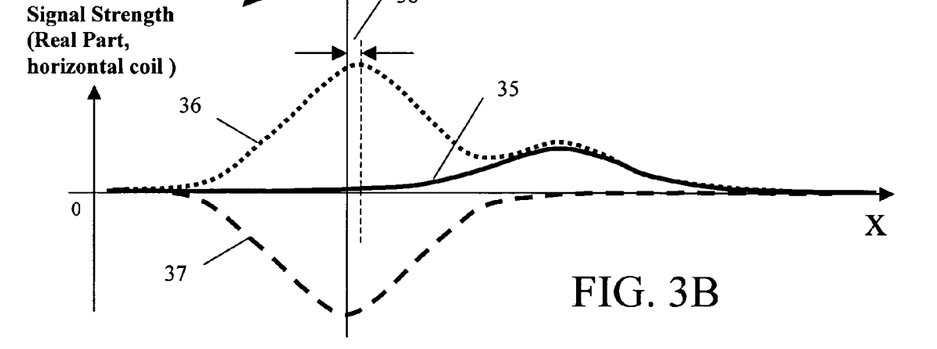

An example of the geometry of a walkover locate is illustrated in FIG. 3A. Unknown parameters ($x_0$, $z_0$, and $I_0$) at point 33 can be estimated, with the parameters ($x_n$, $h_n$) as the measurement set (with the measured parameter $h_n$ being complex). The walkover procedure starts at arbitrary reference position 30 and proceeds, for example, along the path indicated, across the region that has significant detectible signal strength, which will encompass the target cable 31 and all bleedover cables. One of the bleedover cables is represented by cable 32 in FIG. 3A. FIG. 3B shows the real part of the aggregate magnetic field strength as a function of walkover distance (i.e., the distance from target cable 33). Curve 36 is the measured magnitude of the magnetic field strength, which is a summation of the real parts of the magnetic field strength 37 originating from main cable 31 and field strength 35 originating from bleedover cable 32. Only the signal represented by curve 36 is measurable; signals 37 and 35 are indirectly obtained via the optimization.

Figure 4:
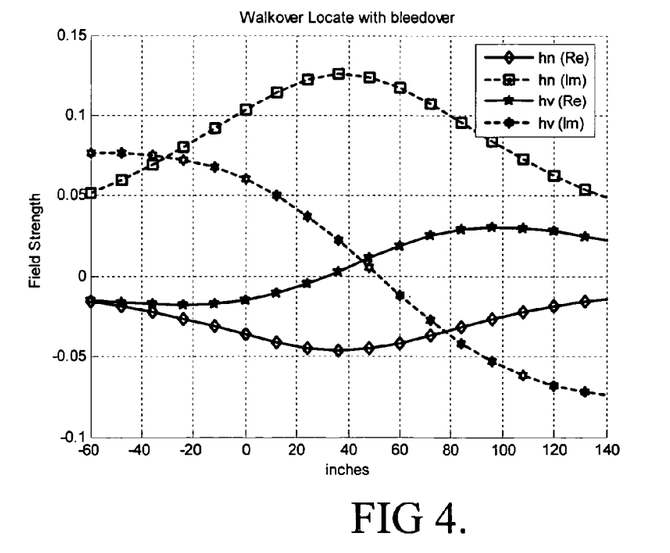
FIG. 4 shows all four field vectors that result from a phase lock on one of the coils (either vertical or horizontal).

In some embodiments, the aggregate field strength can be determined using the demodulation methods described in the '239 application for both horizontal and vertical coils. FIG. 4 shows an example of both real and imaginary aggregate signals from both coils 19 and 14 of line locator 11 for a typical walkover locate which had two significant signal sources (target cable 15 and bleedover cable 16).

Some embodiments of the invention use a forward facing magnetic field sensor, as in coil 24 of FIG. 2, to form a third dimension of field measurements. Although long-haul cables are generally deployed in rights-of-way that have clear cable directions, there can be curvatures and road crossings, for which a front-facing coil is an appropriate method to detect if the operator is walking in a transverse (right angle) direction to the line, rather than at a more oblique angle. The data from coil 24 is generally not used in the optimization, but some embodiments of the invention may extend the field model represented by EQN. 10 to allow off-axis oblique walkovers.

Some embodiments of the optimization procedures performed in model optimization 23 (FIG. 2) tend to be more sensitive to both measurement errors and initial conditions as the number of electromagnetic field sources increases, but optimization can be performed with numerous sources, for example up to four total sources. Buried underground cable vault systems tend to hold many cables; in some cases up to 60 cables may be collocated within a 2 square meter duct. However, due to the importance of physical proximity, bleedover coupling tends to occur in a relatively small subset of cables within the duct. Typically, in addition to the target cable, usually only one or two cables in a large duct are found to be carrying significant bleedover current (e.g., more than 10% of the current in the primary target line). Thus a numerical optimization approach that through gradient progression solves for the set of unknown cable positions, phases, and currents, is compatible with the problem of cable location within a duct.

One complication in the optimization procedure performed in model optimization 23 for solving the vectoring problem is additional field distortion caused by non-zero conduction ($\sigma$) of the soil. In the simple case, where only a single cable is present and the soil conductivity is uniform around the cable, correction for conductivity does not significantly affect the outcome (at worst, the depth is underestimated a bit). However, when multiple cables contribute to the measured magnetic field or when the soil conductivity is not uniform, an optimization can have some problems. Nonzero conductivity causes the field originating from the target cable to have a "ghost" quadrature component, and non-uniformity of the conductivity can cause some spatial distortion in the field from each cable. Although these distortions can introduce a bias into the vectoring estimate, the measured signal from target cable 15 can be allowed in some embodiments of the model to have a quadrature component (non-zero phase) in the optimization, minimizing this potential source of error by allowing a phase rotation to offset the quadrature component that might be present due to this situation.

Figure 6:
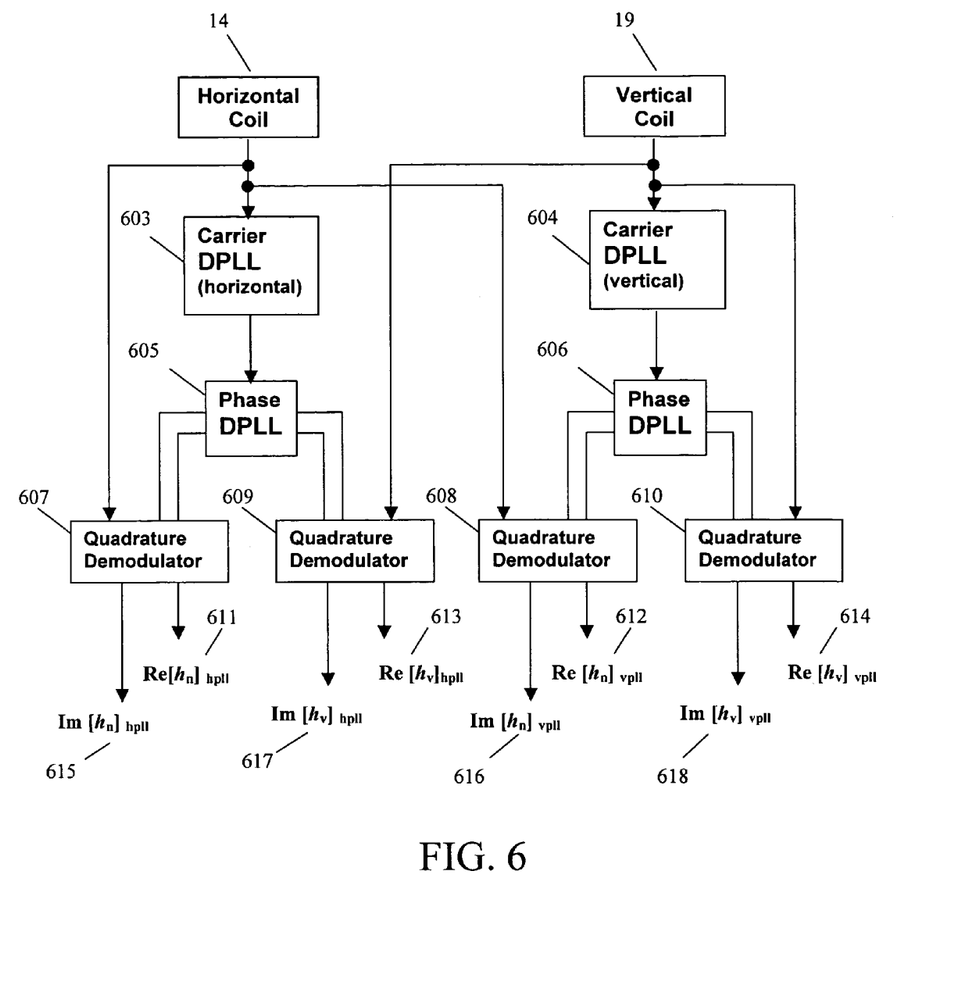
FIG. 6 illustrates an embodiment of signal processing in a locator system according to the present invention.

To set up the Levenberg-Marquardt non-linear optimization problem, measurements of the parameters (x, $h_n$, $h_v$) are made in line locator 11. The $h_n$ are measured simultaneously using horizontal (peak) coil 14 and $h_v$ using vertical (null) coil 19. In some embodiments, a demodulation approach such as that described in the '239 application can be utilized. In this way it is possible to fit both the horizontal model and the vertical model using optimization 23 and select the best-behaved model from the statistics that are inherent in the optimization process. FIG. 6 illustrates the processing flow for a locator according to some embodiments of the present invention. Because in a highly distorted field, sharp nulls can exist at various points in the walkover, a dual, nested, digital phase locked loop (DPLL, as described in the '376 application) can be separately connected to each of detector coils 14 and 19, which in turn is used to demodulate both sets of complex measurements of $h_n$, $h_v$, from the horizontal and vertical coils. Nested PLL pairs formed by DPLL 603 and DPLL 605 and by DPLL 604 and DPLL 606 are used to demodulate the phase signal from coils 14 and 19, respectively. To ensure that a solid phase lock is obtained for every x-position at which measurements are taken, duplicate field strength signals can be computed for each of coils 14 and 19. In this way, each walkover generates two pairs of complex signals, $[h_n, h_v]_{hpll}$ (611, 613, 615, and 617) and $[h_n, h_v]_{vpll}$ (612, 614, 616, and 618), where the hpll and vpll subscripts denote which digital phase locked loop was used in processing. One pair of the signals from a typical walkover is displayed in FIG. 4 (in particular, $[h_n, h_v]_{hpll}$ are shown in their constituent real and imaginary parts).

The field optimization model utilized in model optimization 23 can use the complex field strength vector (with independent variable $x_n$) for the signal strength measured at each of coils 14 and 19. Thus it is possible to define a selection method (per each $x_n$) of which pair of $[h_n, h_v]$ signals to use. In some embodiments the field strength signal magnitudes can be compared (element by element), progressively building the output field strength vector from either the hpll and vpll generated values based upon which is larger than the other by a defined margin. In the end, given a reasonably good amplitude and phase calibration of the signal chains downstream of detector coils 14 and 19, the complex vector of field strength that is used as input to optimization 23 can be arbitrarily constructed of measurement segments based on which embodies the most accurate field strengths. This method minimizes the places in the walkover where sharp nulls in the electromagnetic field degrade the quality of the measurement.

Position info 22 provides the current position information $x_n$ to model optimization 23. The measured values of $x_n$ can be obtained in a variety of ways. In some embodiments, the transect distance increments are computed in situ (within the locate receiver) at the same time intervals that drive the measurement of electromagnetic field strength from coils 19 and 14. Inertial methods such as, for example, from accelerometers, gyroscopes, and digital compasses are the best example of this class of distance measurement devices. However, on-board range finders, stereo imaging systems, and measuring wheels also can be utilized because they do not require a separate device to be managed by the locate technician. A line locator that includes an inertial position-tracking device is described in U.S. patent application Ser. No. 10/407,705 "Buried Line Locator with Integral Position Sensing", by Gordon Pacey and assigned to Metrotech Corporation, which is herein incorporated by reference in its entirety. U.S. patent application Ser. No. 10/997,729 "Centerline and Depth Locating Method for Non-Metallic Buried Utility Lines," by James W. Waite and assigned to Metrotech Corporation, discloses utilization of inertial sensors to result in transverse (to the line) position estimates $x_n$.

Clearly, simple methods like magnetic or optical detection of tick marks on a tape, or simply pressing a button on every desired measurement interval (as determined by a tape measure) can also be used to collect the $x_n$ array during the walkover transect. Yet other methods utilized in position info 22 may make assumptions about the walkover speed being constant, and thus use elapsed time to derive position estimates $x_n$. These methods may be appropriate, especially where line locator 11 is mounted and towed at constant velocity.

Onboard inertial measurement units can also be useful in being able to detect pitch and yaw angles from the ideal walkover transect direction, as might occur during a walkover using a handheld receiver. As such, position info 22 can provide pitch and yaw information to model optimization 23. Pitch and yaw angles can be used to correct the field measurements to represent a fixed direction or, alternatively, the field model can be extended to incorporate the pitch and yaw information.

The Levenberg-Marquardt optimization problem treats each source (target cable 15 and numerous (for example three) strong bleedover cables) as having unknown depth, centerline, and current. The soil conductivity σ can be assumed fixed and equal to zero, although in some embodiments conductivity can also be part of the variable set included in the optimization. Using the notation above, the optimization variables are $z_p$, $x_p$, and $I_p^i + jI_p^q$, where p ranges from 0 to N, and index 0 refers to target cable 15. The superscripts i and q denote the inphase and quadrature components of the current, respectively, such that the phase of the current in that cable is equal to $$\tan^{-1}\left(\frac{I_p^q}{I_p^i}\right).$$

In addition, the angle parameter θ models the phase transfer function on the main cable that affects all measurements uniformly, such that the observed phase on each cable (with respect to the reference phase imparted at the transmitter) is $$\tan^{-1}\left(\frac{I_p^q}{I_p^i}\right) + \theta.$$

Figure 5A:
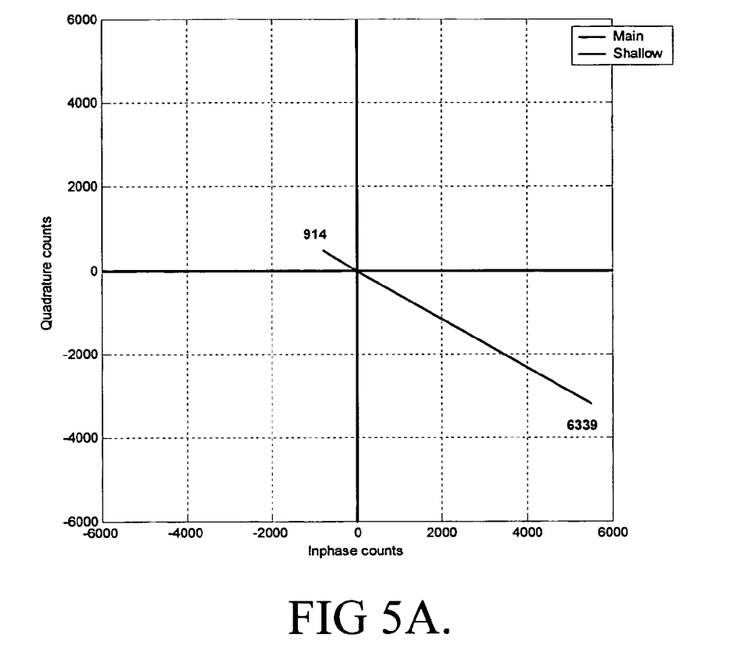
FIGS. 5A and 5B illustrate phasor diagrams of a main cable and a bleedover cable at two sites on a long haul fiber optic line.
Figure 5B:
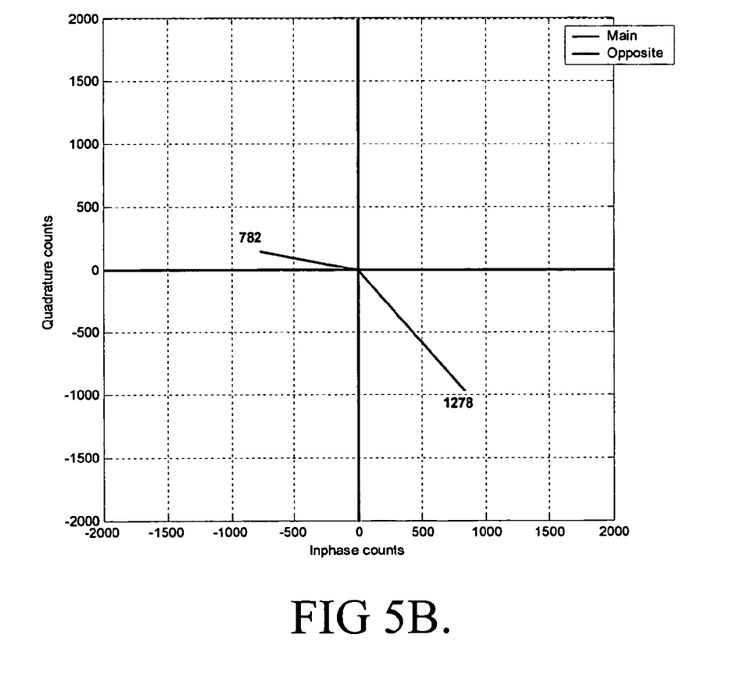

This constant phase rotation of the complex plane accounts for the unknown phase delay along target cable 15 from transmitter to the measurement position. Two phasor diagrams that illustrate the phase characteristics are shown in FIG. 5A and FIG. 5B, respectively. In each diagram, one target cable 15 is shown at a non-zero phase θ between 0 and −90°, and a bleedover cable 16 is shown at phase −180° from the target (FIG. 5A), and −150° (FIG. 5B). Although at transmitter 10 the phase reference is forced to zero, at the two places on the line illustrated in FIGS. 5A and 5B (which can be separated by several miles), the angle θ has rotated because of the signal delay as the signal propogates on the line.

A constraint is placed on every iteration of the Levenberg-Marquardt optimization algorithm. Once per iteration the optimization method results in new current, depth, and centerline estimates for target cable 15 and all bleedover cables 16. The predicted currents are forced to adhere to the equation $$\sum_{p=1}^{k} \sqrt{I_p^{i2} + jI_p^{q2}} \leq \sqrt{I_0^{i2} + jI_0^{q2}} \quad (11)$$

such that the absolute value of the sum of bleedover and return currents cannot be greater than the outgoing current in the targeted line. In all practical cases the magnitude sum on the left side of this inequality is not close to the magnitude of the target cable current, since the walkover field measurements see only distinct conductors, and not the current that is returning through earth ground.

Because there is no a priori information regarding how many bleedover cables 16 carry significant current (that would distort the field emanating from the target cable), a hypothesis test procedure is used to determine the most likely scenario. To accomplish a target cable locate, several (for example four) scenarios are run using the Levenberg-Marquardt optimization method. A first scenario uses a model of the field in which there are no bleedover sources 16 present. Other scenarios add the effects of increasing numbers of bleedover cables 16. In total there are 5, 9, 13, 17, etc. (corresponding to 1, 2, 3, 4, etc. bleedover cables 16, respectively) unknowns for the modeled scenarios, respectively. The optimization of model optimization 23 will always provide a result as long as the number of measurements ($x_n$, $h_n$) is equal to or greater then the number of unknowns. To test which of the hypothetical bleedover scenarios best represents the data, a cost function can be formed using the mean square error of the predicted field (after optimization) compared to the measured data. This is used as a quality metric for that bleedover model. Appropriate choice of a minimum acceptable fit criterion (using the cost function) is an effective way to eliminate walkover locates which are dominated by noise and interference, and thus might result in "false positive" centerline and depth prediction errors.

The hypothesis test procedure can also be sensitive to over-determination of the model, when more bleedover sources 16 are modeled than actually exist in a particular scenario. Although these extra bleedover cables 16 increase the freedom that the optimization has to achieve a good fit, they can also result in a potential centerline prediction bias of target cable 15. Penalties are levied on the cost function as the number of bleedover cables 16 increases, so that the least complex solution that still achieves a targeted model performance is chosen by the hypothesis test procedure.

At the end of the optimization process, and subsequent hypothesis test, the chosen result includes predictions of centerline, depth, current, and phase for target cable 15 and each of the bleedover cables 16. Only the parameters associated with the target cable are of interest, and the accuracy of these predictions must be stated with confidence bounds. A confidence bound (or interval) for these model parameters is developed as follows:

The model for C cables with a parameter set a is $$y_{rh}(x_n, a) = \sum_{j=1}^{C} \frac{k_j z_j}{r_j^2} \cos(\phi_j + \theta)$$

$$y_{ih}(x_n, a) = \sum_{j=1}^{C} \frac{k_j z_j}{r_j^2} \sin(\phi_j + \theta)$$

$$y_{rv}(x_n, a) = \sum_{j=1}^{C} \frac{k_j(x_n - x_j^0)}{r_j^2} \cos(\phi_j + \theta)$$

$$y_{iv}(x_n, a) = \sum_{j=1}^{C} \frac{k_j(x_n - x_j^0)}{r_j^2} \sin(\phi_j + \theta)$$

$$r_j^2 = (x_n - x_j^0)^2 + z_j^2$$

(12)

where $x_n$ are the measurement locations for $n=1, 2, \ldots N$; $y_{rh}, y_{ih}, y_{rv},$ and $y_{iv}$ are the in-phase and quadrature components of the horizontal and vertical fields, respectively; $x_j^0, z_j, k_j$ and $\phi_j$ are the center line, depth, current and phase angle of cable j, and $\theta$ is the overall phase delay; and each term of the sum models the contribution from a single cable. By convention the first term applies to target cable 15.

The optimization cost function that is minimized to estimate the model parameters is the sum-of-squares of the model output errors, $$\chi^2 = \sum_{n=1}^{N} [y_{rh,n} - y_{rh}(x_n, a)]^2 + [y_{ih,n} - y_{ih}(x_n, a)]^2 +$$

$$[y_{rv,n} - y_{rv}(x_n, a)]^2 + [y_{iv,n} - y_{iv}(x_n, a)]^2$$

(13)

where $y_{rh,n}$ etc. are the measurements.

Associated with the model is the curvature matrix, composed of the second derivatives of the cost function with respect to the model parameters, $$\alpha = \left[\frac{1}{2}\frac{\partial^2 \chi^2}{\partial a_p \partial a_q}\right]$$

(14)

often approximated with only the first derivatives of the model as $$\alpha_{pq} = \sum_{j=1}^{N} \frac{\partial y_{rh}}{\partial a_p}\frac{\partial y_{rh}}{\partial a_q} + \frac{\partial y_{ih}}{\partial a_p}\frac{\partial y_{ih}}{\partial a_q} + \frac{\partial y_{rv}}{\partial a_p}\frac{\partial y_{rv}}{\partial a_q} + \frac{\partial y_{iv}}{\partial a_p}\frac{\partial y_{iv}}{\partial a_q}$$

(15)

The covariance matrix of the model parameters at the optimum is important for estimating a confidence interval. This matrix is the inverse of the curvature matrix, $$C = \alpha^{-1}$$

(16)

The primary parameters estimated by the optimization are the centerline and depth of the main cable, and the estimated values of those parameters can be annotated by a confidence interval.

Under the following assumptions, the confidence interval of each individual model parameter can be estimated with relatively simple equations:
  a) The model fits the data well.
  b) Measurement errors in the data are approximately normally distributed.
  c) A linear model inside the uncertainty range of the model parameters can approximate the model.

In some embodiments, the variation in the optimization cost function with respect to any single parameter approximately follows a chi-square distribution with a single degree of freedom. This leads to the following expression for the confidence interval of a parameter $\alpha_k$ as $$\Delta \alpha_p = \pm t \sigma_y \sqrt{C_{pp}}$$

(17)

where t is chi-square, $C_{pp}$ is the k-th diagonal entry of the parameter covariance matrix and where the variance $\sigma_y$ is computed from the 2nd derivative of the optimization function and the estimated variance of the residual fit. For example, t=2 gives a 95.4% confidence interval and t=3 gives a 99.7% interval.

Condition a) requires that the model fit be tested before computing the confidence intervals. If the variance of the measurement errors is known independently, this may be done through a chi-squared probability test; however this is not the case here. Instead, the same hypothesis test as described above to determine which of four bleedover scenarios is used to determine the accuracy of the model fit.

Condition b) is likely to hold in most cases, but could be enhanced by removing obvious outliers in the data that may be present due to non-stationary interference effects.

Since the model varies smoothly near the optimum, condition c) may be assumed to hold for small confidence intervals.

Given this, the confidence intervals for the centerline and depth of the main cable may be computed via EQN. 17 if $C_{kk}$ is known for both. As shown above, this computation requires the evaluation of the full $\alpha$ matrix, i.e., the second derivatives of the cost function with respect to all optimization variables. However, we will assume that this matrix is sufficiently diagonally dominant so that $$C_{pp} = \alpha_{pp}^{-1}$$

(18)

This is generally true if the parameters of the model are relatively independent, as is the case here; and if the model gives a good approximation of the data, which is true according to condition a).

For the model of EQN. 10, the second derivatives of the estimates with respect to the centerline and depth of the main cable, $x^0_1$ and $z_1$ are easily evaluated analytically.

When both horizontal and vertical measurements are present, the confidence range of both parameters can be identical, otherwise not.

The embodiments described above can be used to precisely locate a target cable in areas where bleedover can cause large errors in positioning. Although some extra time is associated with setting up the walkover (the transect should be associated with a reference point away from the centerline (point 30 in FIG. 3A)), the benefit in positioning accuracy is large. However, when bleedover is minimal, it is not always necessary to perform the walkover locate using optimization methods to determine the target cable position. In fact, traditional peak and null centerline detection methods can be just as precise in some scenarios. Thus there is a benefit in having a "bleedover detection" method built in to the locate receiver in order to assist the user in determining when a walkover locate should be performed.

Figure 7A:
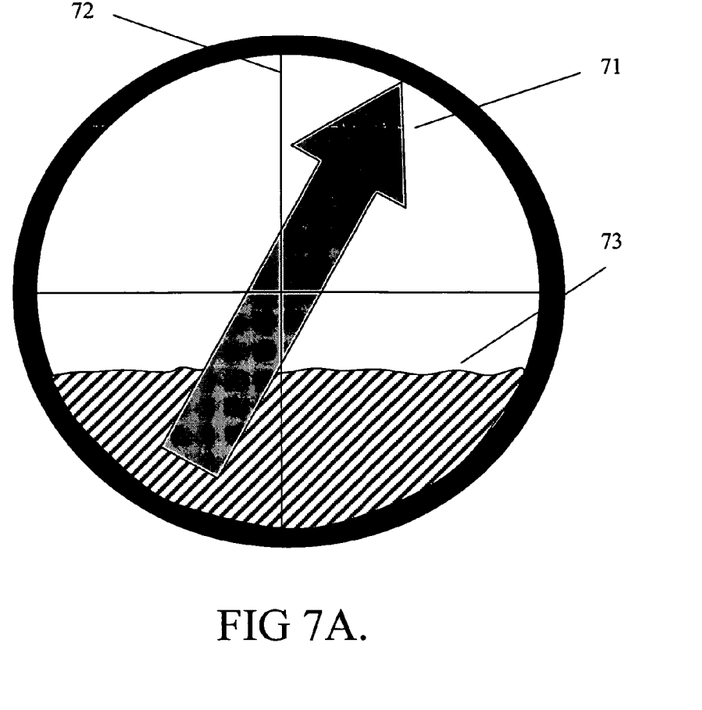
FIGS. 7A and 7B illustrate a component of a display for a line locator according to the present invention.
Figure 7B:
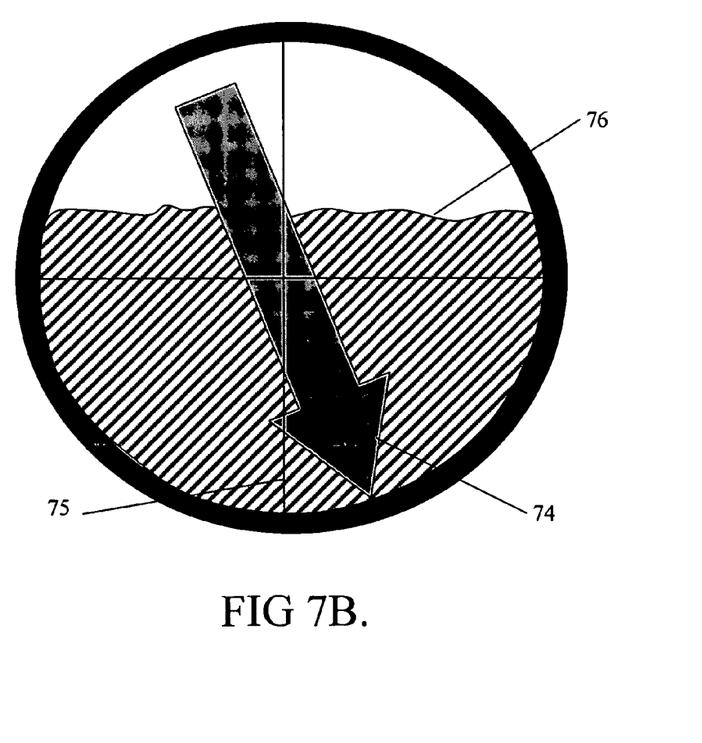

FIGS. 7A and 7B illustrate a component of graphical display that is presented on the locator display 12, in the standard line locate modes. Pointer 71 shows the user the detected line and signal direction. The amount of deflection of the pointer (off of vertical line 72) is based on the measured signal strength of the forward facing coil 24 compared to the signal strength of the horizontal coil 14. In effect, this gives a qualitative measure of whether the tracked line has an impending curvature. If the locate receiver is facing directly forward, and the line extends straight ahead, then the Pointer 71 is directed straight upward (toward the upper half plane of the circle).

Pointer 71 is also used to denote the direction of the signal in the cable or pipe, as discussed in the '376 application. When the aggregate signal phase is positive the pointer movement is in the upper half plane, else it is in the lower half plane, as in pointer 74 of FIG. 7B. The aggregate signal phase can be taken from the horizontal coil quantity $$\tan^{-1}\left(\frac{\operatorname{Im}[h_n]_{hp//}}{\operatorname{Re}[h_n]_{hp//}}\right),$$

or the equivalent from the vertical coil (whichever has greater signal magnitude).

The shaded backgrounds 73 and 76 of FIGS. 7A and 7B represents the level of bleedover in the measured signal. The aggregate signal phase is used to determine the level of bleedover, which is a qualitative indication of the degree of distortion in the magnetic field. When the phase is zero, the level of the shaded background is zero (there is no shading). When the phase is 90°, indicating that the signals from bleedover cables predominate the measurement, the background is completely shaded. The update rate of the bleedover detection icon is on the order of 30 Hz, or more quickly than the field changes while an operator is walking down the line during a locate. Thus, the user is effectively warned about bleedover situations and can take explicit action to invoke the walkover locate precise positioning mode.

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A method for precise location of underground cables and pipes, comprising:
    measuring a set of complex electromagnetic field strengths at a plurality of positions along a path that crosses a target line;
    modeling an expected complex field strength at each of the plurality of positions with the target line and a hypothesized number of bleedover cables to form a set of values corresponding to a set of individual models for the target line for each of the hypothesized number of bleedover cables;
    determining which of the set of individual models is a best model; and
    determining parameters related to the target line from the best model in order to assist in locating the target line.

2. The method of claim 1, wherein the parameters related to the target line include at least one estimated value chosen from a list consisting of a centerline position, depth of the target line, and a current carried in the target line.

3. The method of claim 1, wherein determining which of the set of individual models is the best model includes
    applying a cost function to each of the set of individual models; and
    choosing the best model.

4. The method of claim 3, wherein the cost function includes a penalty for the number of bleedover cables used.

5. The method of claim 3, wherein the cost function includes the mean square error fit to the set of complex electromagnetic field strengths.

6. The method of claim 3, further including rejecting false positive locates due to excessive noise and interference.

7. The method of claim 3, further including optimizing the cost function.

8. The method of claim 7, wherein the cost function can be optimized with respect to a single parameter that follows a chi-square distribution with a single degree of freedom.

9. The method of claim 1, further including estimating a confidence interval for the values associated with the best model.

10. The method of claim 9, wherein estimating the confidence interval includes calculating a Gaussian model for error statistics.

11. The method of claim 1, wherein measuring a set of complex electromagnetic field strengths includes traversing a handheld locate receiver over the target cable by walking.

12. The method of claim 1, wherein measuring a set of complex electromagnetic field strengths includes determining a first magnetic field strength from a first coil and determining a second magnetic field strength from a second coil, the first coil being orthogonal to the second coil.

13. The method of claim 12, wherein modeling an expected complex field strength includes employing a first field model to estimate the first magnetic field strength by adjusting the values and employing a second field model to estimate the second magnetic field strength by adjusting the values.

14. The method of claim 12, wherein the first coil and the second coil are oriented in a "V" configuration, with one coil tilted above horizontal and the other tilted below horizontal, both of which are aligned in a direction transverse to the cable direction.

15. The method of claim 13, wherein a best field model to be utilized for determining the first magnetic field strength and the second magnetic field strength is chosen for each of the plurality of positions depending on which of the first magnetic field strength or second magnetic field strength is stronger, thereby avoiding null fields sensed by one of the first coil or the second coil by replacing that complex field measurement with values from an alternative model.

16. The method of claim 15, wherein a dedicated digital phase locked loop operates on the signal from each of the first coil and the second coil, thereby enhancing performance when null fields are sensed by one of the first coil and the second coil and are at a maximum on the other of the first coil and the second coil.

17. The method of claim 12, wherein the first coil and the second coil includes
  a horizontal coil arranged to detect a horizontal component of a magnetic field; and
  a vertical coil arranged to detect a vertical component of the magnetic field.

18. The method of claim 1, wherein measuring a set of complex electromagnetic field strengths includes measuring magnetic field strengths with three orthogonal coils, and modeling an expected complex field strength includes utilizing
  a full three-dimensional field model that adjusts the values to estimate the complex electromagnetic field strengths.

19. The method of claim 1, wherein measuring a set of complex electromagnetic field strengths includes measuring magnetic field strengths with three orthogonal coils and wherein modeling the expected complex field strength includes utilizing a two dimensional field model that relates the set of values to generate the expected complex field strength at two of the three orthogonal coils and utilizes a third of the three orthogonal coils to validate that the path is roughly perpendicular to a direction along a length of the target cable.

20. The method of claim 1, wherein the amplitude and phase of the complex electromagnetic field strengths are derived from demodulated in-phase and quadrature signals.

21. The method of claim 1, wherein the plurality of positions along the path are determined by inertial tracking.

22. The method of claim 13, further including detecting pitch, roll, and yaw angles by inertial tracking and correcting the complex electromagnetic field strengths for aberrations that occur while measuring the set of complex electromagnetic field strengths.

23. The method of claim 1, wherein the plurality of positions along the path are determined by stereo imaging.

24. The method of claim 1, wherein the plurality of positions along the path are determined by laser or ultrasonic rangefinding.

25. The method of claim 1, wherein the plurality of positions along the path are determined with a measuring wheel.

26. The method of claim 1, wherein the plurality of positions along the path are determined using remote sensing.

27. The method of claim 26, wherein the remote sensing includes detection of tick marks on a tape measure.

28. The method of claim 26, wherein the remote sensing includes user input that a predetermined measurement position has been reached.

29. The method of claim 1, wherein modeling expected complex field strengths includes optimizing each of the set of individual models.

30. The method of claim 29, wherein optimizing includes applying a Levenberg-Marquardt algorithm.

31. The method of claim 1, wherein the optimizing includes applying a global grid search algorithm.

32. The method of claim 1, wherein optimizing includes applying a minimum norm algorithm.

33. The method of claim 1, further including displaying parameters related to the target line.

34. The method of claim 33, further including displaying values associated with the set of values of the individual model corresponding to the best model.

35. The method of claim 34, wherein the displayed values includes an indication of the number of bleedover cables utilized in the best model.

36. The method of claim 34, wherein an indication of the relative strength of different directions of detected magnetic field.

37. A line locator, comprising:
  a plurality of coil detectors, each of the plurality of coil detectors oriented to measure a component of a magnetic field;
  circuitry coupled to receive signals from the plurality of coil detectors and provide quadrature signals indicating a complex magnetic field strength;
  a position locator for indicating a position of the line locator;
  a processor coupled to receive the complex magnetic field strength and the position and calculate values related to a target line; and
  a display coupled to the processor, the display indicating to a user the values related to the target line, wherein the processor executes software for performing the following:
    modeling an expected complex field strength corresponding to complex field strengths measured at the plurality of coil detectors at each of a plurality of positions determined by the position locator with the target line and a hypothesized number of bleedover cables to form a set of values corresponding to a set of individual models for the target line for each of the hypothesized number of bleedover cables;
    determining which of the set of individual models is a best model; and
    determining parameters related to the target line from the best model in order to assist in locating the target line.

38. The line locator of claim 37, wherein the parameters related to the target line include at least one estimated value chosen from a list consisting of a centerline position, depth of the target line, and a current carried in the target line.

39. The line locator of claim 37, wherein the processor executes software for determining which of the set of individual models is the best model includes
  applying a cost function to each of the set of individual models; and
  choosing the best model.

40. The line locator of claim 37, wherein the processor executes software for estimating a confidence interval for the set of values associated with the best model.

41. The line locator of claim 37, wherein the plurality of coil detectors includes a first coil for determining a first magnetic field and a second coil for determining a second magnetic field strength from a second coil, the first coil being orthogonal to the second coil.

42. The line locator of claim 37, wherein the position locator can indicate the position along a plurality of positions positioned along the path are determined by inertial tracking.

43. The line locator of claim 37, wherein the position locator can detect pitch, roll, and yaw angles by inertial tracking and the processor can correct the complex electromagnetic field strengths for aberrations that occur while measuring the set of complex electromagnetic field strengths.

44. The line locator of claim 37, wherein the processor executes software for modeling expected complex field strengths includes optimizing each of the set of individual models.

* * * * *